United States Patent
Xu et al.

(10) Patent No.: US 9,838,091 B2
(45) Date of Patent: Dec. 5, 2017

(54) SYSTEM AND METHOD FOR A SCALE-INVARIANT SYMBOL DEMODULATOR

(71) Applicant: Futurewei Technologies, Inc., Plano, TX (US)

(72) Inventors: Ge Xu, Columbia, MD (US); Cornelius Janse van Rensburg, Wylie, TX (US)

(73) Assignee: Futurewei Technologies, Inc., Plano, TX (US)

(*) Notice: Subject to any disclaimer, the term of this patent is extended or adjusted under 35 U.S.C. 154(b) by 294 days.

(21) Appl. No.: 14/553,448

(22) Filed: Nov. 25, 2014

(65) Prior Publication Data
US 2015/0146652 A1   May 28, 2015

Related U.S. Application Data

(60) Provisional application No. 61/909,250, filed on Nov. 26, 2013.

(51) Int. Cl.
*H04W 24/04* (2009.01)
*H04L 25/49* (2006.01)
(Continued)

(52) U.S. Cl.
CPC ......... *H04B 7/0413* (2013.01); *H04B 7/0665* (2013.01); *H04L 27/36* (2013.01); *H04L 27/38* (2013.01)

(58) Field of Classification Search
CPC ...... H04B 7/04; H04B 7/0665; H04B 7/0413; H04L 27/38; H04L 27/36; H04W 72/04; H04W 24/04; H04W 72/042; H04W 24/00
(Continued)

(56) References Cited

U.S. PATENT DOCUMENTS

| 8,194,602 B2* | 6/2012 | van Rensburg ....... H04L 5/0023 370/329 |
| 8,811,522 B2* | 8/2014 | Harel .................. H04B 7/0408 375/259 |

(Continued)

FOREIGN PATENT DOCUMENTS

WO   2013074026 A1   5/2013

OTHER PUBLICATIONS

International Search Report and Written Opinion of the International Searching Authority received in Patent Cooperation Treaty Application No. PCT/US14/67428 dated Feb. 23, 2015, 10 pages.
(Continued)

*Primary Examiner* — Edan Orgad
*Assistant Examiner* — Vanneilian Lalchinthang
(74) *Attorney, Agent, or Firm* — Slater Matsil, LLP

(57) ABSTRACT

It is possible to improve the spectral efficiency of multi-layer multiple input multiple output (MIMO) transmissions by estimating the magnitude parameter at the receiver side, rather signaling the magnitude parameter from the transmitter to the receiver. In long term evolution (LTE) networks, the user equipment (UE) may estimate the power allocation (Pa) parameter by executing a series of steps. For example, the UE may define a single unknown variable from a received downlink MIMO signal, extend the single unknown scalar variable to a multivariate signal model for multiple channels (N), convert the multivariate signal model to a MIMO configured signal model, and then obtain the Pa parameter from the MIMO configured multivariate signal model.

18 Claims, 20 Drawing Sheets

(51) Int. Cl.
  *H04B 15/00* (2006.01)
  *H04B 7/0413* (2017.01)
  *H04B 7/06* (2006.01)
  *H04L 27/38* (2006.01)
  *H04L 27/36* (2006.01)

(58) Field of Classification Search
  USPC .......................................................... 370/329
  See application file for complete search history.

(56) References Cited

U.S. PATENT DOCUMENTS

| | | | | |
|---|---|---|---|---|
| 2006/0089104 A1* | 4/2006 | Kaikkonen | ........... | H04W 72/08 455/67.13 |
| 2007/0291867 A1* | 12/2007 | Khan | ................... | H04B 7/0669 375/267 |
| 2008/0207151 A1* | 8/2008 | Rinne | ................. | H04B 7/0871 455/140 |
| 2009/0147881 A1 | 6/2009 | Lin et al. | | |
| 2009/0247175 A1* | 10/2009 | van Rensburg | ....... | H04L 5/0023 455/450 |
| 2010/0260059 A1* | 10/2010 | Zhang | ................. | H04W 52/325 370/252 |
| 2011/0188393 A1* | 8/2011 | Mallik | .................. | H04B 7/024 370/252 |
| 2012/0020433 A1* | 1/2012 | Bhattad | ................ | H04B 7/0639 375/296 |
| 2012/0257692 A1 | 10/2012 | Yeung et al. | | |
| 2012/0327795 A1 | 12/2012 | Mallik et al. | | |
| 2013/0040682 A1* | 2/2013 | Chang | .................... | H01Q 1/243 455/517 |
| 2013/0242886 A1* | 9/2013 | Chen | ................. | H04W 72/0413 370/329 |
| 2013/0315115 A1* | 11/2013 | Kim | .................... | H04J 11/0056 370/280 |
| 2014/0086166 A1 | 3/2014 | Lindbom et al. | | |

OTHER PUBLICATIONS

Xu, G., "Pa Sensitivity Analysis on Channel Decoding," Oct. 30, 2013, 15 pages.
"On the Signalling of Data/RS Power Ratio for PDSCH with 16QAM," Source: Qualcomm Europe, 3GPP TSG-RAN WG1 #52, R1-080654, Sorrento, Italy, Feb. 11-15, 2008, 5 pgs.

* cited by examiner

SYSTEM AND METHOD FOR A SCALE-INVARIANT SYMBOL DEMODULATOR

This patent application claims priority to U.S. Provisional Application No. 61/909,250, filed on Nov. 26, 2013 and entitled "System and Method for a Scale-Invariant Symbol Demodulator," which is hereby incorporated by reference herein as if reproduced in its entirety.

TECHNICAL FIELD

The present invention relates to communications, and, in particular embodiments, to a system and method for a scale-invariant symbol demodulator.

BACKGROUND

When a receiver demodulates a higher order modulation symbol such as quadrature amplitude modulation (QAM)-16 or QAM-64, it typically needs a magnitude reference parameter in order to determine the regions for slicing. Typically, this magnitude reference parameter is provided by a pilot signal as well as some additional messages when there is a known offset between the powers of the pilot symbol and the data symbol. In Long Term Evolution (LTE) networks, the magnitude parameter is signaled to each user equipment (UE) via a Layer 3 radio resource control (RRC) message referred to as the $P_a$ parameter. This message consumes valuable bandwidth, and may cause a delay.

SUMMARY

Technical advantages are generally achieved, by embodiments of this disclosure which describe system and method for a scale-invariant symbol demodulator.

In accordance with an embodiment, a method for communicating over a multiple input multiple output (MIMO) channel is provided. In this example, the method includes transmitting a downlink MIMO signal from a base station to a user equipment. The downlink MIMO signal comprises multiple layers communicated directly to the user equipment in accordance with a phase parameter and a magnitude parameter. The method further comprises signaling the phase parameter to the user equipment without signaling the magnitude parameter to the user equipment. An apparatus for performing this method is also provided.

In accordance with another embodiment, yet another method for communicating over a MIMO channel is provided. In this example, the method includes receiving a downlink MIMO signal from a base station at a user equipment. The downlink MIMO signal comprises multiple layers communicated directly to the user equipment. The method further comprises receiving a phase parameter associated with the downlink MIMO signal at the UE, estimating a magnitude parameter associated with the downlink MIMO signal, and demodulating the downlink MIMO signal in accordance with the phase parameter and the magnitude parameter. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Techniques for estimating magnitude parameters for single-layer MIMO signals are described in U.S. Patent Application No. 2009/0247175 entitled "System and Method for Downlink Control Signal Structure for Multi-User MIMO," which is hereby incorporated by reference herein as if reproduced in its entirety. Aspects of this disclosure extend the concept of estimating magnitude parameters to multi-layer MIMO signals.

With spatial multiplexing, a base station may send multiple data streams to UEs in a downlink transmission over the same frequency. The downlink transmission may have one or more layers for each data stream generated by spatial multiplexing. The layers in spatial multiplexing are associated with the number of codewords (e.g., codeword 1, codeword 2, etc.). Each layer may be identified by a size of the corresponding precoding vector, which may be equal to the number of transmit antenna ports. The number of layers (or streams) may also correspond to the rank of the transmission. A codeword is an independently encoded data block corresponding to a single transport block (TB) through higher-layer signaling, e.g., medium access control (MAC). The number of codewords in spatial multiplexing directly affects the control overhead and receiver complexity since spatial multiplexing with multiple codewords may apply adaptive modulation and coding (AMC) and error control on a per-codeword basis.

Figure 1:
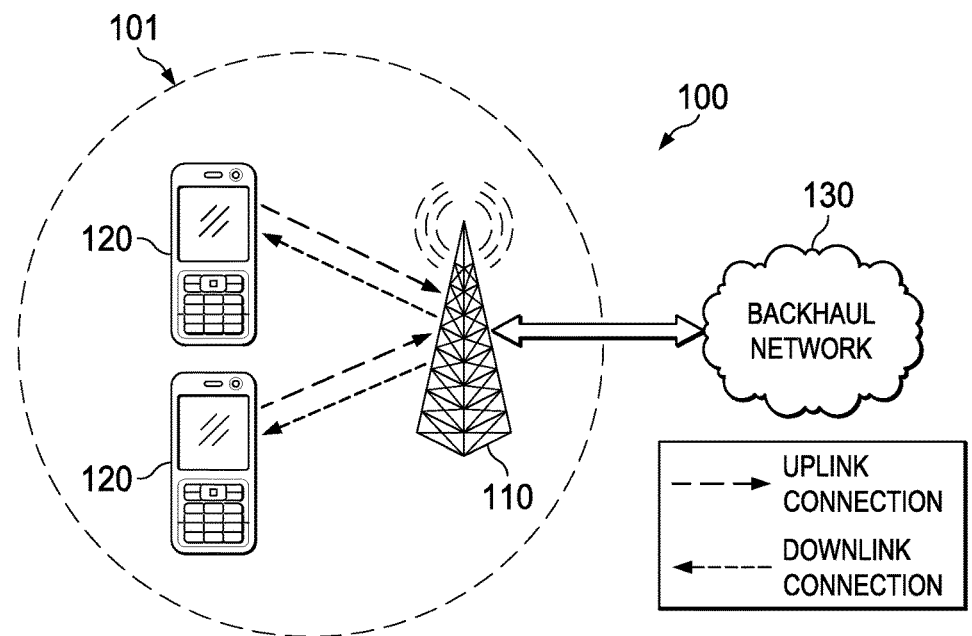
FIG. 1 illustrates a diagram of an embodiment wireless network.

FIG. 1 illustrates a network 100 for communicating data. The network 100 comprises an access point (AP) 110 having a coverage area 101, a plurality of mobile devices 120, and a backhaul network 130. The AP 110 may comprise any component capable of providing wireless access by, inter alia, establishing uplink (dashed line) and/or downlink (dotted line) connections with the mobile devices 120, such as a base station, an enhanced base station (eNB), a femtocell, and other wirelessly enabled devices. The mobile devices 120 may comprise any component capable of establishing a wireless connection with the AP 110, such as an user equipment (UE), a mobile station (STA), or other wirelessly enabled devices. The backhaul network 130 may be any component or collection of components that allow data to be exchanged between the AP 110 and a remote end (not shown). In some embodiments, the network 100 may comprise various other wireless devices, such as relays, low power nodes, etc.

Figure 2:
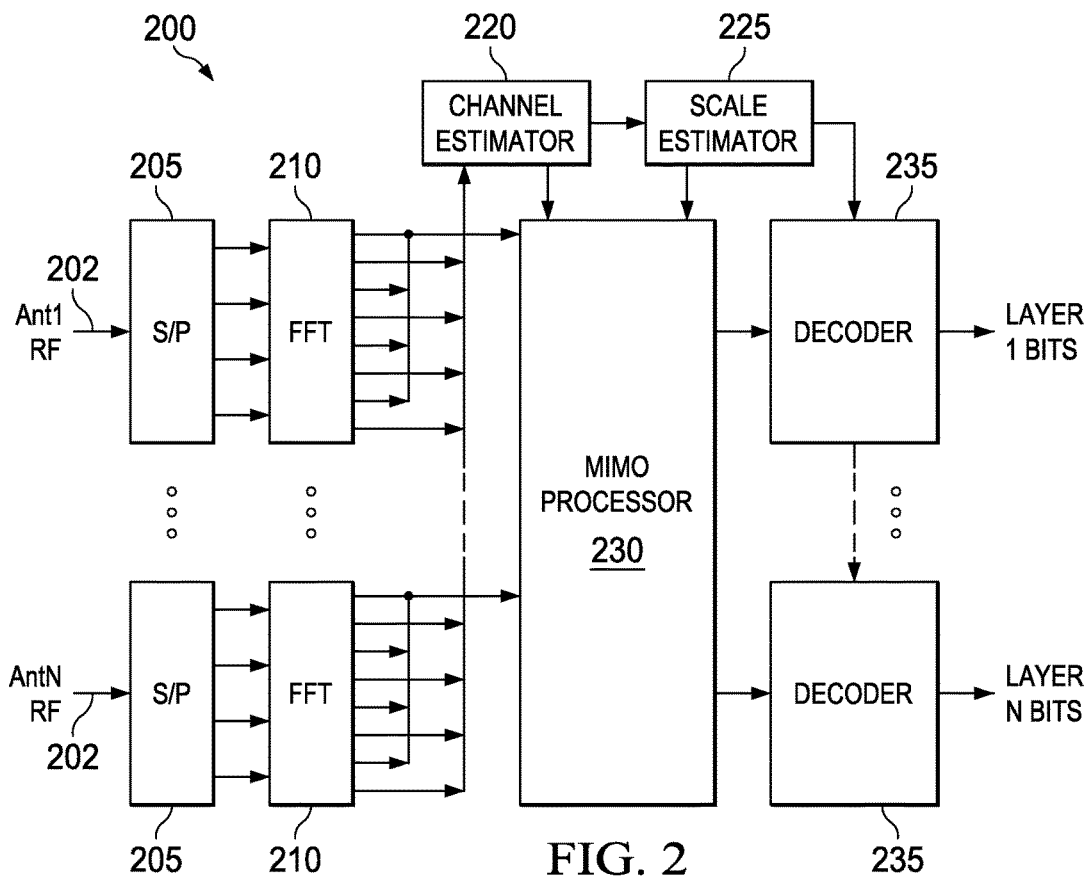
FIG. 2 illustrates a diagram of an embodiment MIMO receiver system.

FIG. 2 illustrates an embodiment MIMO receiver system 200 having two receiving antennas and two layered signal transmissions to estimate a magnitude parameter of a multi-layer MIMO signal. The MIMO receiver system 200 comprises serial-to-parallel converters (S/P) 205, fast fourier transforms (FFT) 210, a channel estimator 220, a scale estimator 225, a MIMO processor 230, and decoders 235. The S/Ps 205 convert serial signals received from two or more antenna radio frequency (RF) chains 202 (e.g., Ant 1, . . . Ant N) to parallel signals and forward the parallel signals to the FFTs 210. The FFTs 210 transform the signal received from the S/Ps 205 back to the frequency domain and forward parallel streams output from the FFTs 210 to the MIMO process 230 and the channel estimator 220. The channel estimator 220 performs channel estimation using the phase parameter and magnitude parameter received from the FFTs 210 to obtain a scale invariant estimation. The channel estimator 220 sends the scalar invariant estimation to the scale estimator 225 and the MIMO processor 230. The scale estimator 225 performs a scaling of single unknown scalar variable to obtain a least square estimator using a received symbol vector, a channel matrix vector, and an additive white gaussian noise (AWGN) vector. The MIMO processor 230 processes information transmitted from the FFTs 210, the channel estimator 220, and the scale estimator 225, and then transmits the signals to the decoders 235. The decoders 235 generate multiple layered bits (e.g., layer 1 and 2 bits) using pre-defined decoding method.

Figure 3:
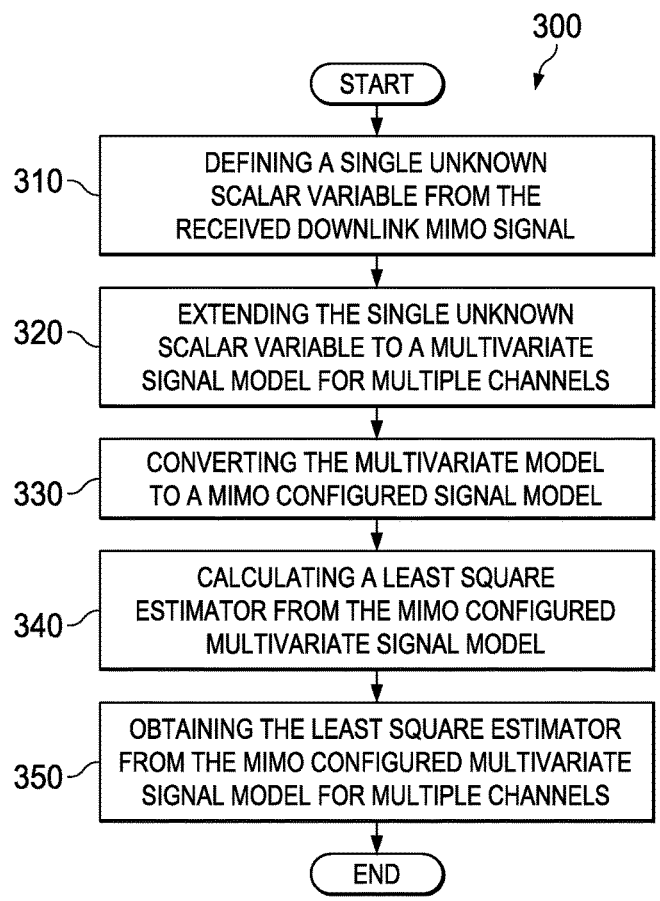
FIG. 3 illustrates a flow chart of an embodiment method for estimating a magnitude parameter.

FIG. 3 illustrates an embodiment method 300 for obtaining a magnitude parameter, e.g., a least square estimator. As shown, the method 300 begins at step 310, where the receiver defines a single unknown variable from a received downlink MIMO signal using received symbols, transmitted symbols, channel information, and additive white Gaussian noise (AWGN). In an embodiment, the received downlink MIMO signal may consist of multiple layers. Next, the method 300 proceeds to step 320, where the receiver extends the single unknown scalar variable to a multivariate signal model for multiple channels (N) using a received symbol vector, a transmitted symbol vector, a channel matrix, and an AWGN vector. Subsequently, the method 300 proceeds to step 330, where the receiver converts the multivariate signal model to a MIMO configured signal model using a number of transmit antennas and a number of receive antennas with the received symbol vector, the transmitted symbol vector, the channel matrix, and the AWGN vector. Thereafter, the method 300 proceeds to step 340, where the receiver calculates a least square estimator from the MIMO configured multivariate signal model using the transmitted symbol vector and the channel matrix vector. Finally, the method 300 proceeds to step 350, where the receiver obtains the least square estimator from the MIMO configured multivariate signal model for multiple channels (N). These steps are generally carried out in sequence, however, under certain circumstances, there may be parallel aspects among the steps.

An embodiment LTE UE receiver is insensitive to an arbitrary and unknown scaling of a QAM symbol constellation. Typically this arbitrary scaling can occur due to the enhanced Node B (eNB) changes the physical downlink shared channel (PDSCH) to cell-specific reference signal (C-RS) power ratio (also known as $P_a$) without informing the UE. An embodiment UE estimates this arbitrary scaling factor for decoding any M-QAM constellation with M>4. Embodiments may be used for both single-input single output (SISO) and multiple-input multiple-output (MIMO) channels, and there have not been observed any noticeable degradation in block error rate (BLER) performance when the UE estimates the arbitrary scale factor versus knowing it perfectly. An embodiment uses blind scaling estimates based on prior knowledge of scheduler constraints and provides a simplified standard by removing the Pa parameter. In further embodiments the estimation generally may be performed in any receiver and the scaling is especially useful when the receiver does the symbol to bit slicing. Note that the noise power estimation ($\sigma^2$) is typically performed based on the variance of the received signal relative to the C-RS. Given the presence of an arbitrary scaling, this scaling may be applied to the noise estimate as well.

With respect to a scaling estimator, consider the following signal model $y(t)=\alpha h x(t)+w(t)$ where $y(t)$ is the received symbol, $x(t)$ is the transmitted symbol, $h$ is the channel, $w(t)$ is the additive white gaussian noise (AWGN), and $\alpha$ is the arbitrary and unknown scaling. Without loss of generality, and to simplify the notation, the time (t) dependence may be dropped and ignored. According to prior knowledge of the expected values of $E\{xx^*\}=1$, $E\{ww^*\}=\sigma^2$, and $h$, an unknown scale factor $\alpha$ may be estimated. Because both the symbols and the noise are zero mean, independent and identically distributed (i.i.d.) and independent of each other $E\{yy^*\}=\alpha^2(hh^*)+\sigma^2$.

Given N channel uses, a vector of the received symbols $[y_1, \ldots, y_N]^T$ and a vector of the channels $[h_1, \ldots, h_N]^T$ may be defined. Based on $y_k y_k^*$ to estimate $E\{yy^*\}$, therefore the minimum least square estimator of $\alpha^2$ is $$\hat{\alpha}^2 = \sum_{k=1}^{N} \frac{(y_k y_k^* - \sigma^2)(h_k h_k^*)}{\sum_{j=1}^{N} (h_j h_j^*)^2}. \tag{3}$$

The estimator in (3) is specific to scalar variable signal model for the MIMO configuration with $n_t$ transmit antennas and $n_r$ receive antennas, the signal model $y(t)=\alpha H x(t)+w(t)$ (4) may be defined, where $y(t)$ is the received symbol vector, $x(t)$ is the transmitted symbol vector, $H$ is the channel matrix, and $w(t)$ is the AWGN noise vector. From assumption, $$E\{xx^H\} = I_{n_t}$$

and $$E\{ww^H\} = \sigma^2 I_{n_r},$$

the equation (5) may be derived.

$$E\{yy^H\}\alpha^2(HH^H) + \sigma^2 I_{n_r}. \tag{5}$$

For N channel use with received symbol vector $[y_1, \ldots, y_N]^T$ and channel matrix vector $[H_1, \ldots, H_N]^T$, the least square estimator is $$\hat{\alpha}^2 = \sum_{k=1}^{N} \frac{\left(\sum_{i=1}^{n_r}(y_k y_k^H(i,i) - \sigma^2)\right)\left(\sum_{i=1}^{n_r} H_k H_k^H(i,i)\right)}{\sum_{j=1}^{N}\left(\sum_{i=1}^{n_r} H_j H_j^H(i,i)\right)^2}. \quad (6)$$

Embodiment C++ code for the estimator in (6) is provided in Table 1.

TABLE 1

```
cmat Rxx = zeros_c(nRx,nRx);
double denominator=0;
double numerator=0;
for (int k = 0; k < Nvec; k++)
{
Rxx = H(k)*H(k).H( );
double H2=0;
for (int j=0;j < nRx;j++)
{ H2=H2+abs(Rxx(j,j));}
denominator+=H2*H2;
numerator+=(abs(Y(k)*conj(Y(k)))-nRx*sigma2)*H2;
}
double EstBoost=sqrt(numerator/denominator);
```

In a link simulation, a SISO channel with a rate (1/3) convolution (and turbo) encoding followed by a soft input soft output (SISO) decoder may be evaluated. The simulation parameters listed in Table 2 are used to obtain a block error rate (BLER), particularly in a 1% to 10% range, as the only performance metric. In each of FIGS. 4A-4R, the curves from left to right represent for a QAM-16 modulation: 2, Pa=6; 2, Pa=5; 2, Pa=4; 2, Pa=3; 2, Pa=2; 2, Pa=1; 2, Pa=0; 2, Pa=−1; 2, Pa=−2; 2, Pa=−3; 2, Pa=−4; 2, Pa=−5; 2, Pa=−6; and for a QAM-64 modulation: 3, Pa=6; 3, Pa=5; 3, Pa=4; 3, Pa=3; 3, Pa=2; 3, Pa=1; 3, Pa=0; 3, Pa=−1; 3, Pa=−2; 3, Pa=−3; 3, Pa=−4; 3, Pa=−5; 3, Pa=−6. Lines marked with an "O" are the reference case where Pa is known, and lines marked with an "X" is where the Pa is estimated.

TABLE 2

| | |
|---|---|
| Information bits | 1000 |
| Channel Coherence time | 500 symbols, this corresponds to REs in 3 RB's (12 × 12 × 3) |
| Antennas(Tx, Rx) | (1, 1)&(2, 2) |
| Channel Models | AWGN & Block fading & TU3 |
| Channel Encoding | Convolution & Turbo Coding |
| Scheduler | None |
| Channel Estimation | Perfect |
| $P_a$ range | −6 dB . . . 6 dB |
| Noise Power Estimation ($\sigma^2$) | Perfect |

Figure 4A:
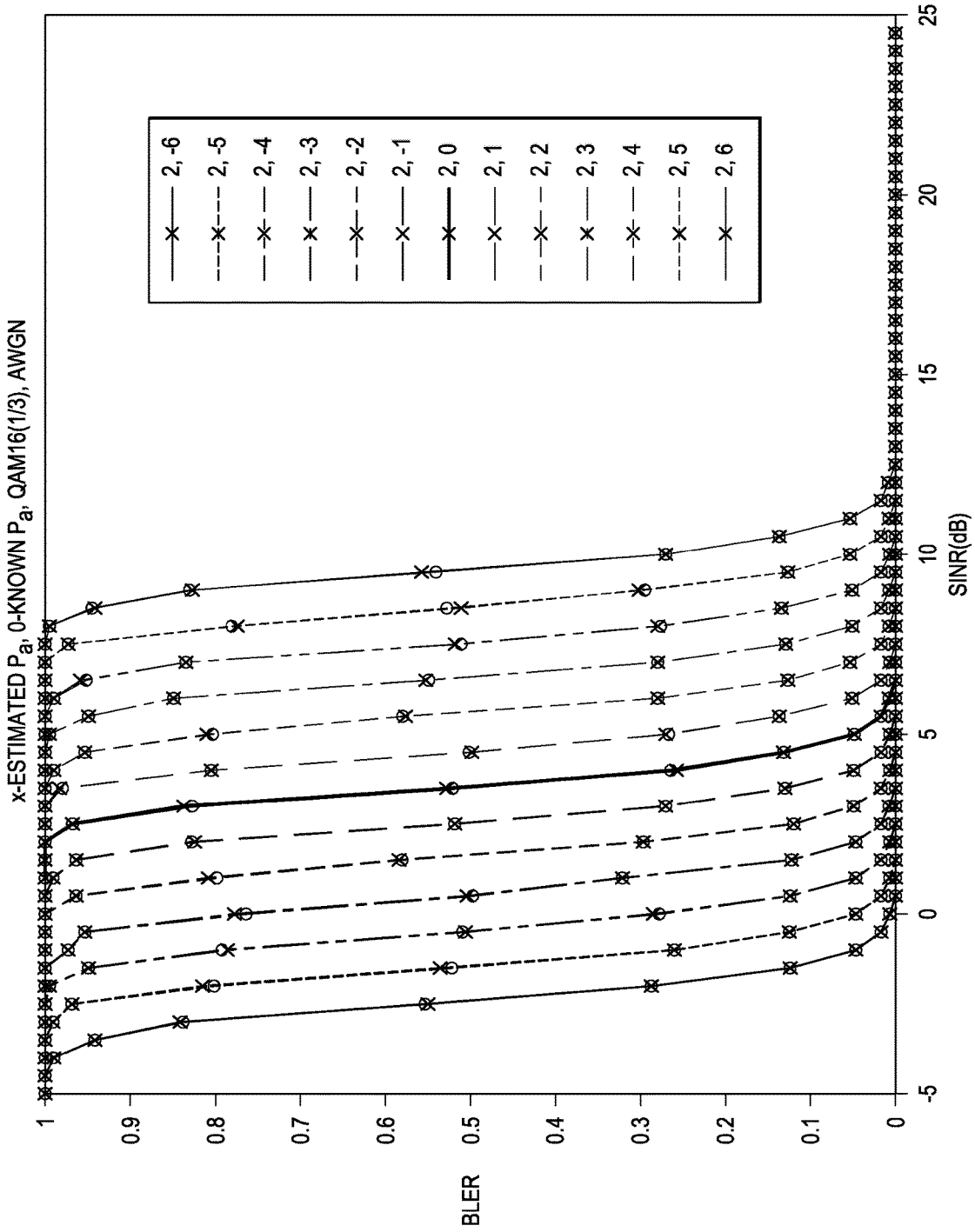
FIGS. 4A-4R illustrate graphs of block error rate (BLER) curves for various channel models and encodings.
Figure 4B:
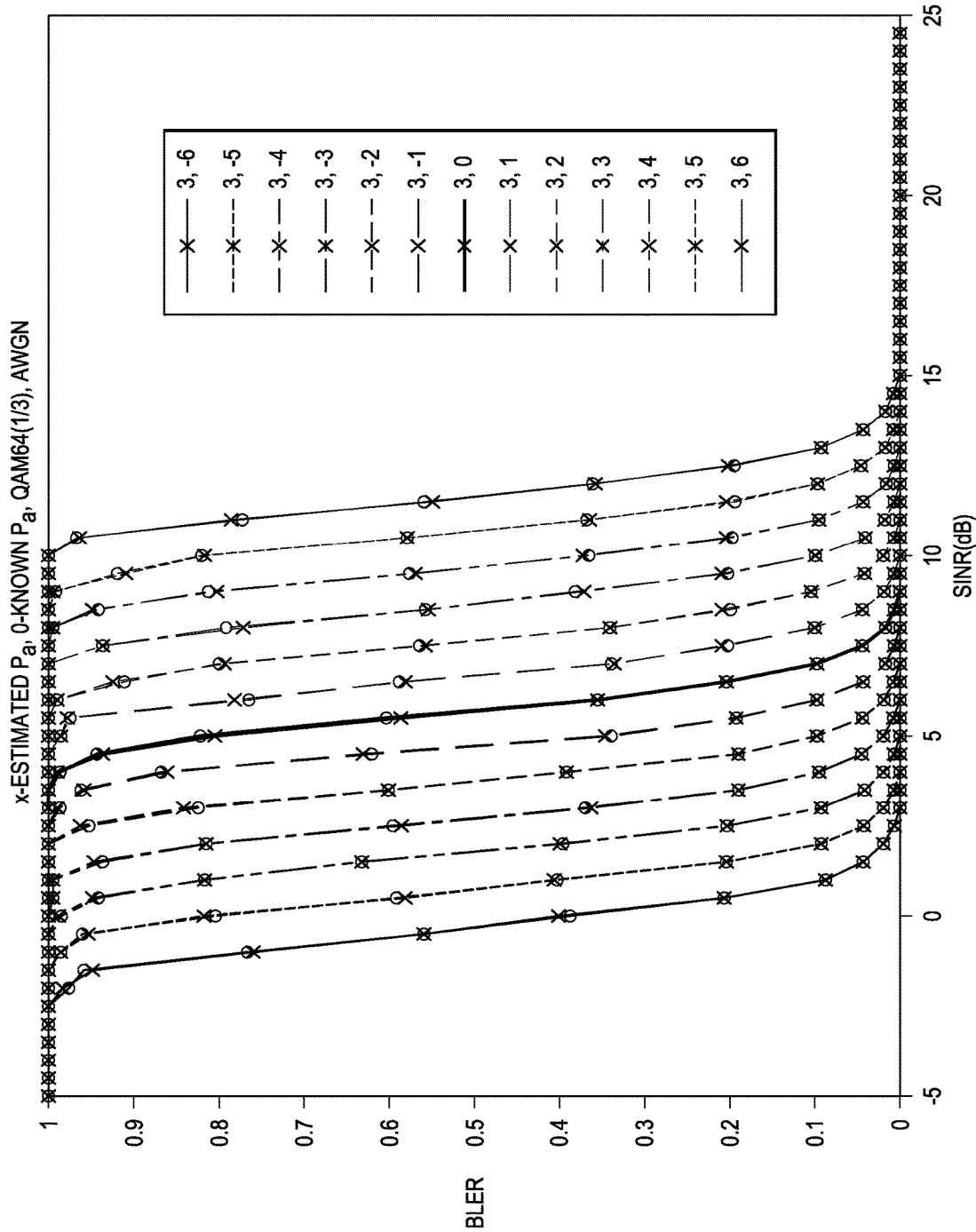

For the AWGN Channel, h=1 is constant. The BLER curves are shown in FIGS. 4A and 4B. No noticeable degradation is visible. More specifically, FIG. 4A illustrates BLER Curves for x-Estimated Pa vs. O-Known Pa for QAM16 (1/3) and FIG. 4B illustrates BLER Curves for x-Estimated Pa vs. O-Known Pa for QAM64 (1/3) in the AWGN channel model.

Figure 4C:
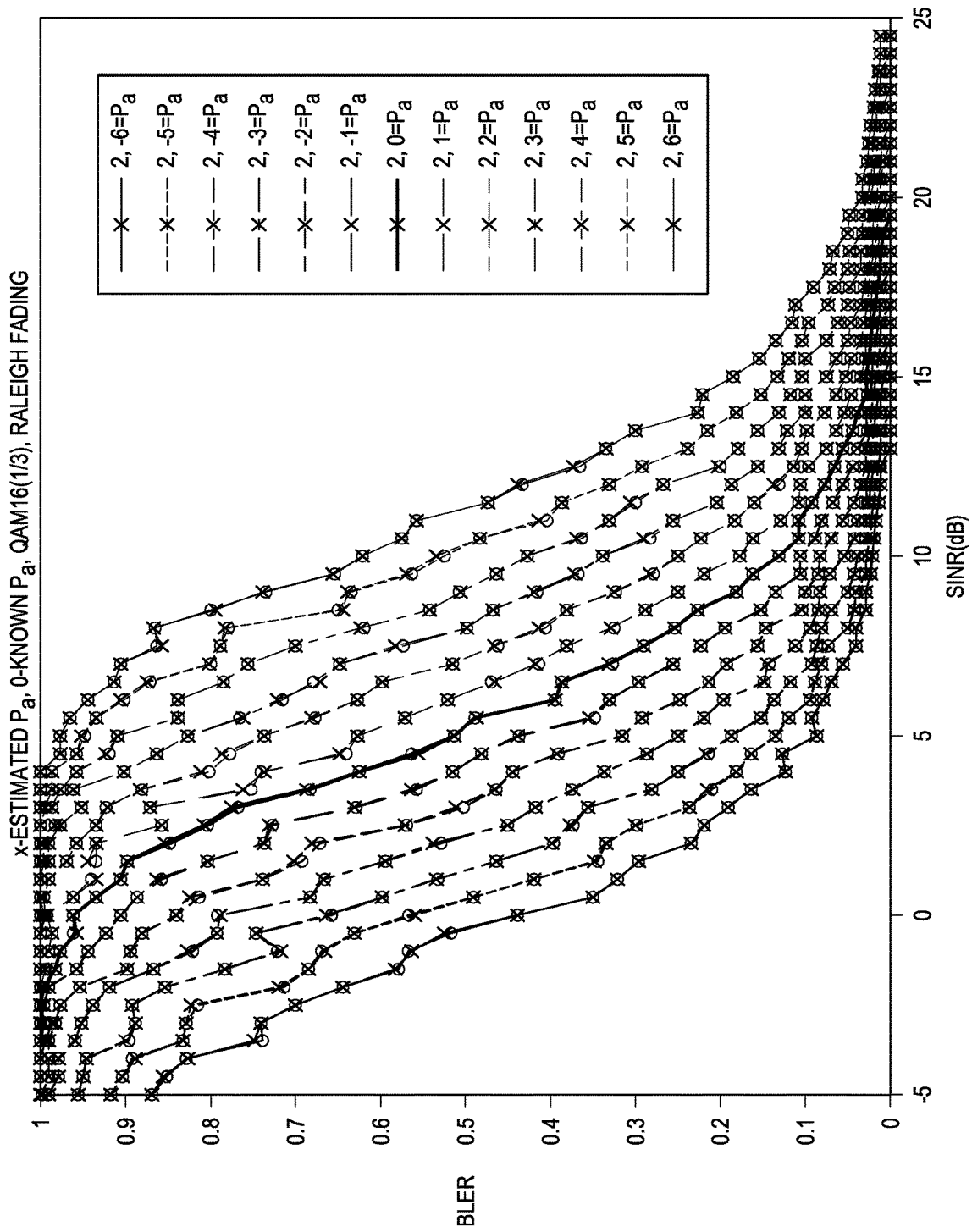
Figure 4D:
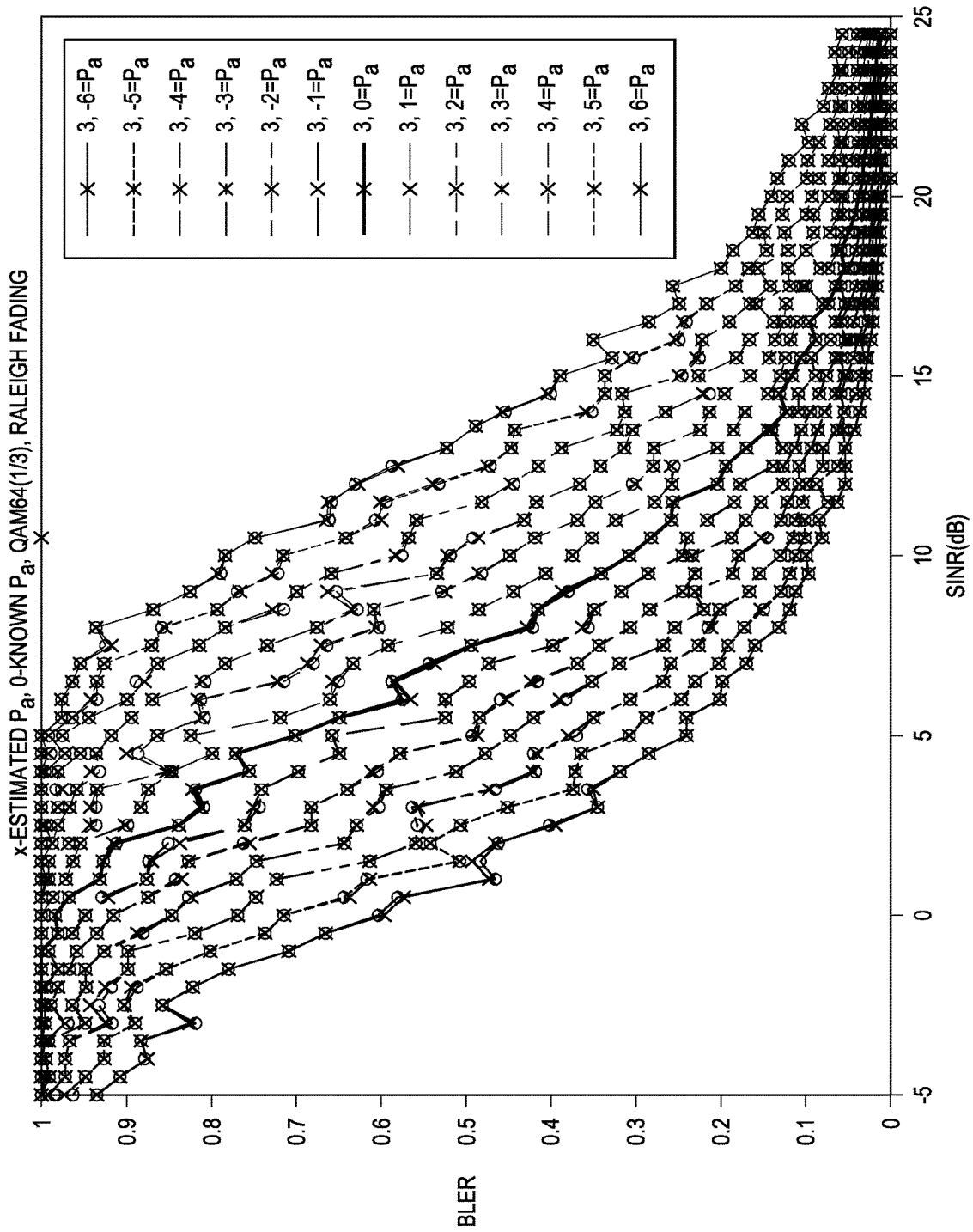

For the Block Fading Raleigh Channel, h is complex Gaussian and changes every 500 symbols i.i.d. The BLER curves are shown in FIGS. 4C and 4D. No noticeable degradation is visible. More specifically, FIG. 4C illustrates BLER Curves for x-Estimated Pa vs. O-Known Pa for QAM16 (1/3) and FIG. 4D illustrates BLER Curves for x-Estimated Pa vs. O-Known Pa for QAM64 (1/3) in Raleigh fading channel model.

Figure 4E:
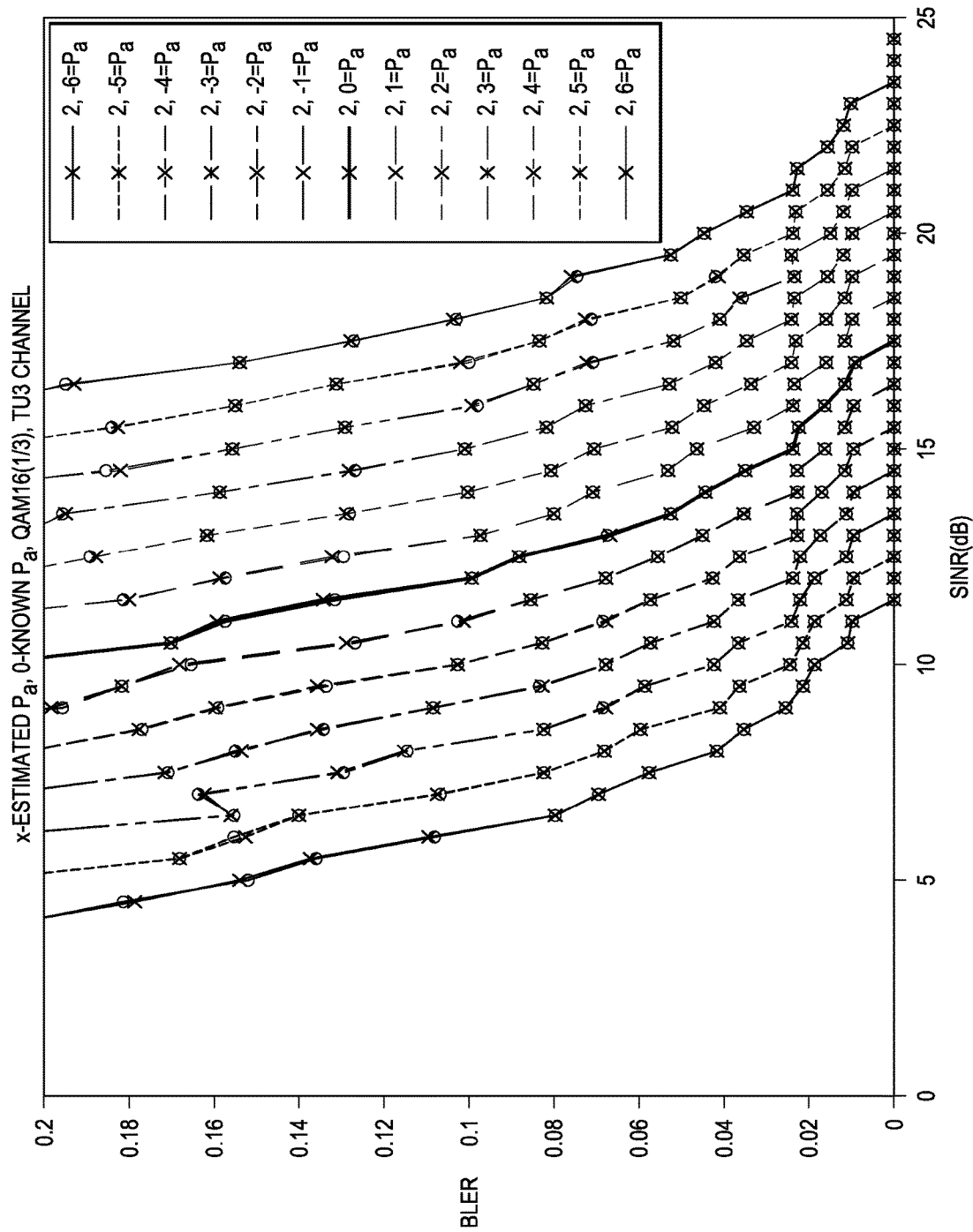
Figure 4F:
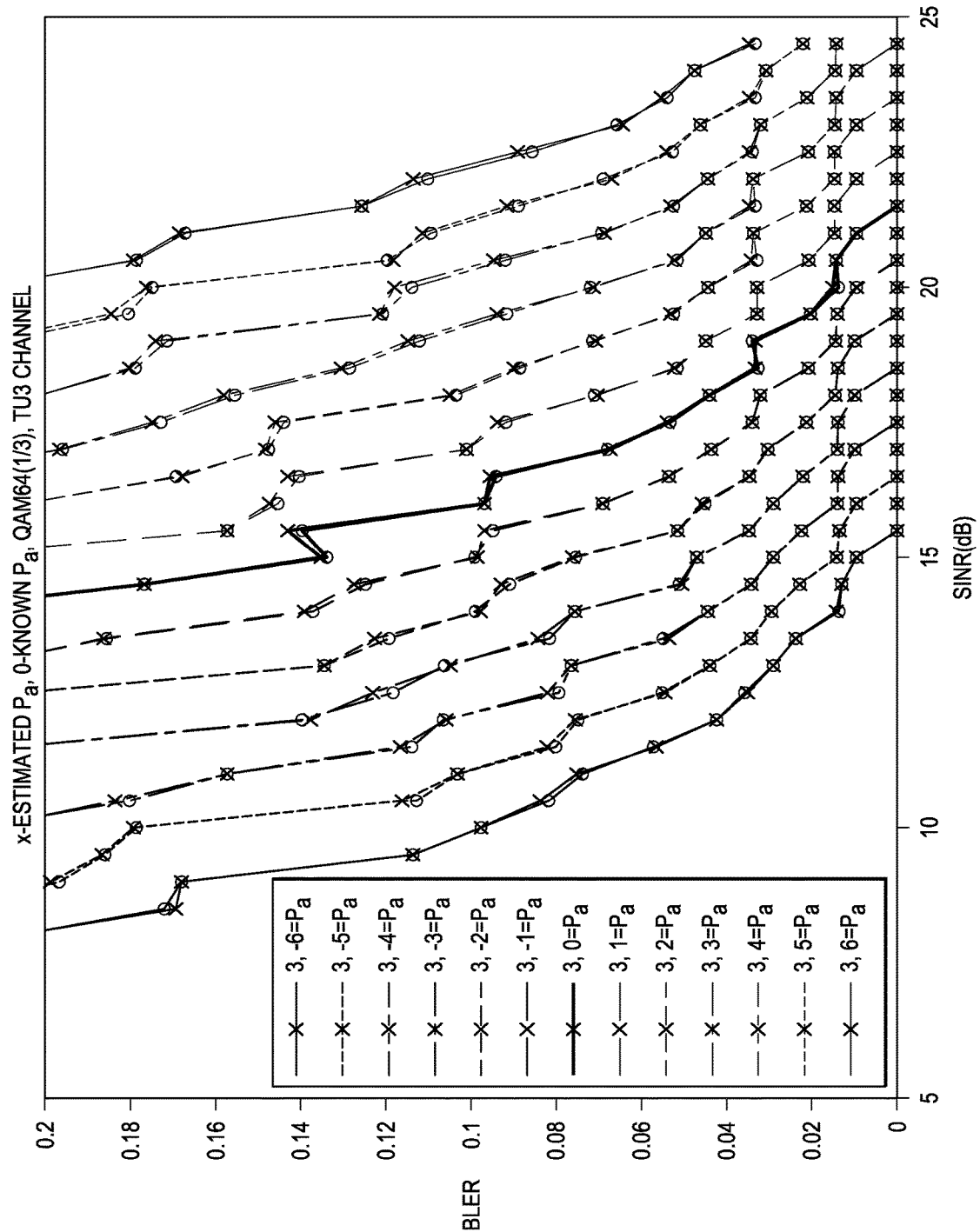

For the TU Channel with convolution encoding, h is generated according to a typical urban 3 km/h channel model with 3 resource blocks (RBs) per codeblock. The BLER curves are shown in FIGS. 4E and 4F. No noticeable degradation is visible. More specifically, FIG. 4E illustrates BLER Curves for x-Estimated Pa vs. O-Known Pa for QAM16 Convolutional (1/3) and FIG. 4F illustrates BLER Curves for x-Estimated Pa vs. O-Known Pa for QAM64 Convolutional (1/3) in TU 3 kmph Rayleigh fading channel model.

Figure 4G:
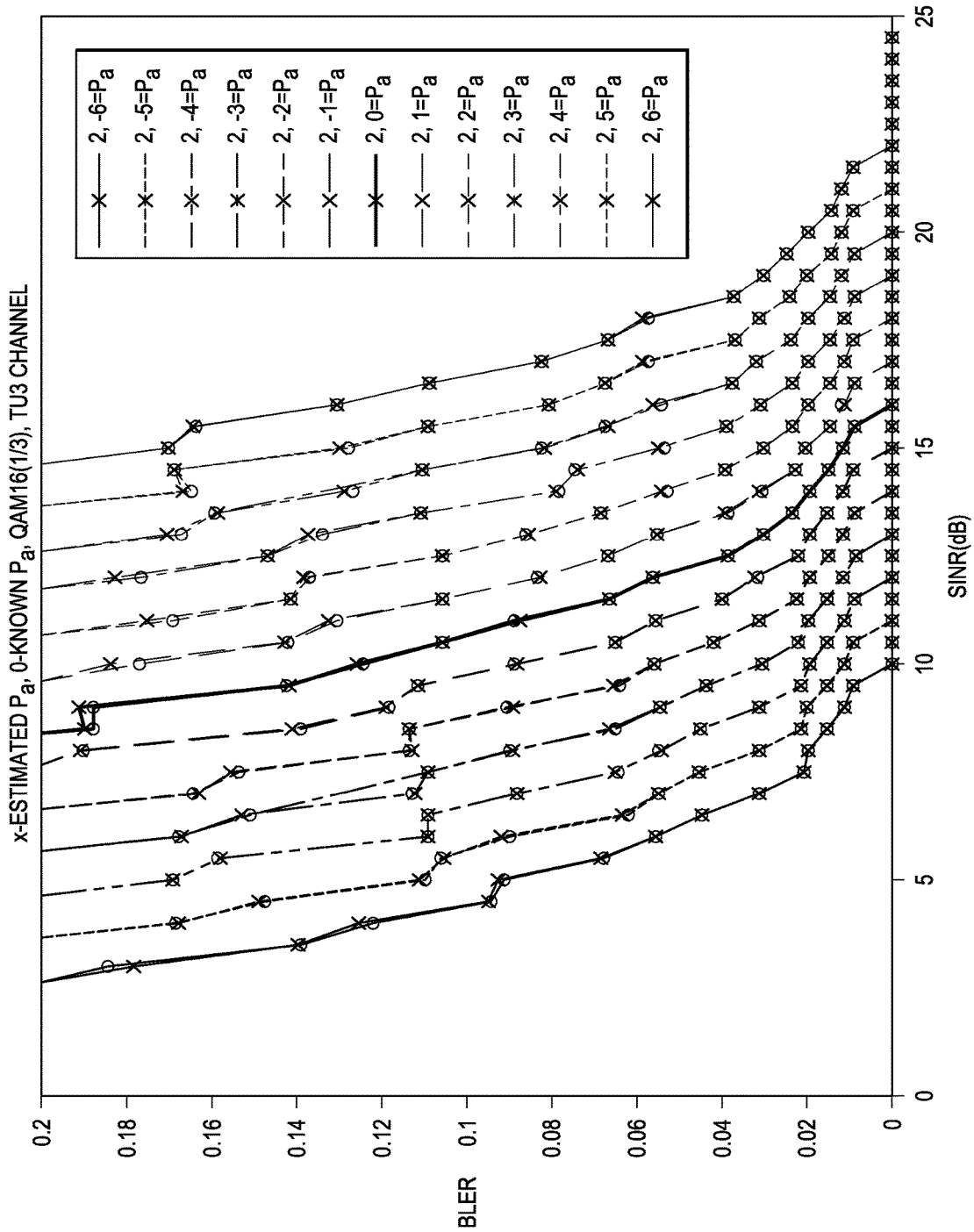
Figure 4H:
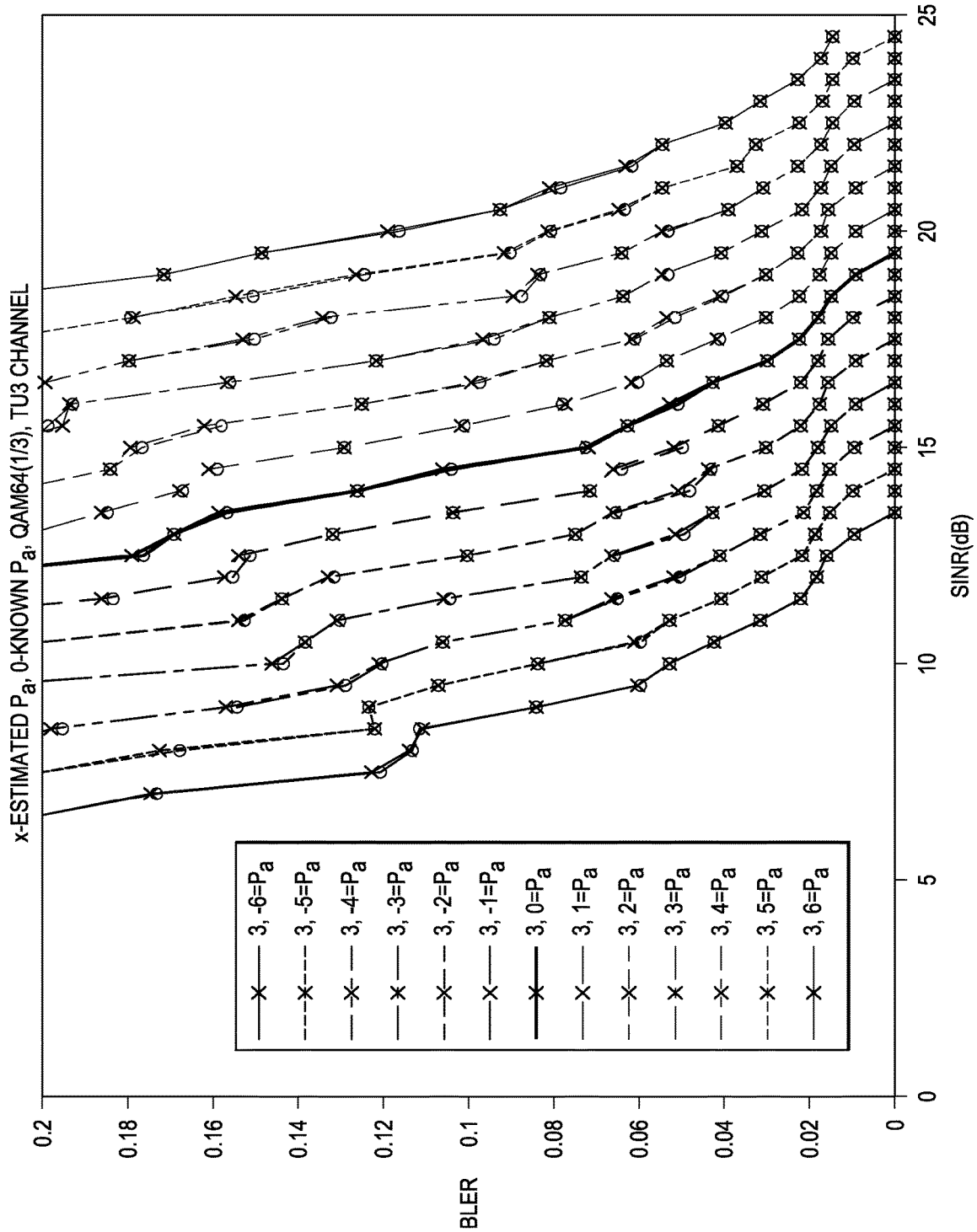

For the TU Channel with turbo encoding, h is generated according to a typical urban 3 km/h channel model with 3 RBs per codeblock. The BLER curves are shown in FIGS. 4G and 4H. No noticeable degradation is visible. More specifically, FIG. 4G illustrates BLER Curves for x-Estimated Pa vs. O-Known Pa for QAM16 for Turbo (1/3) and FIG. 4H illustrates BLER Curves for x-Estimated Pa vs. O-Known Pa for QAM64 for Turbo (1/3) in TU 3 km/h Rayleigh fading channel model.

In another embodiment, a link level simulation of a 2×2 MIMO channel with a rate (1/3) convolution (& turbo) encoding is evaluated. The same simulation parameters in Table 2 are used.

Figure 4I:
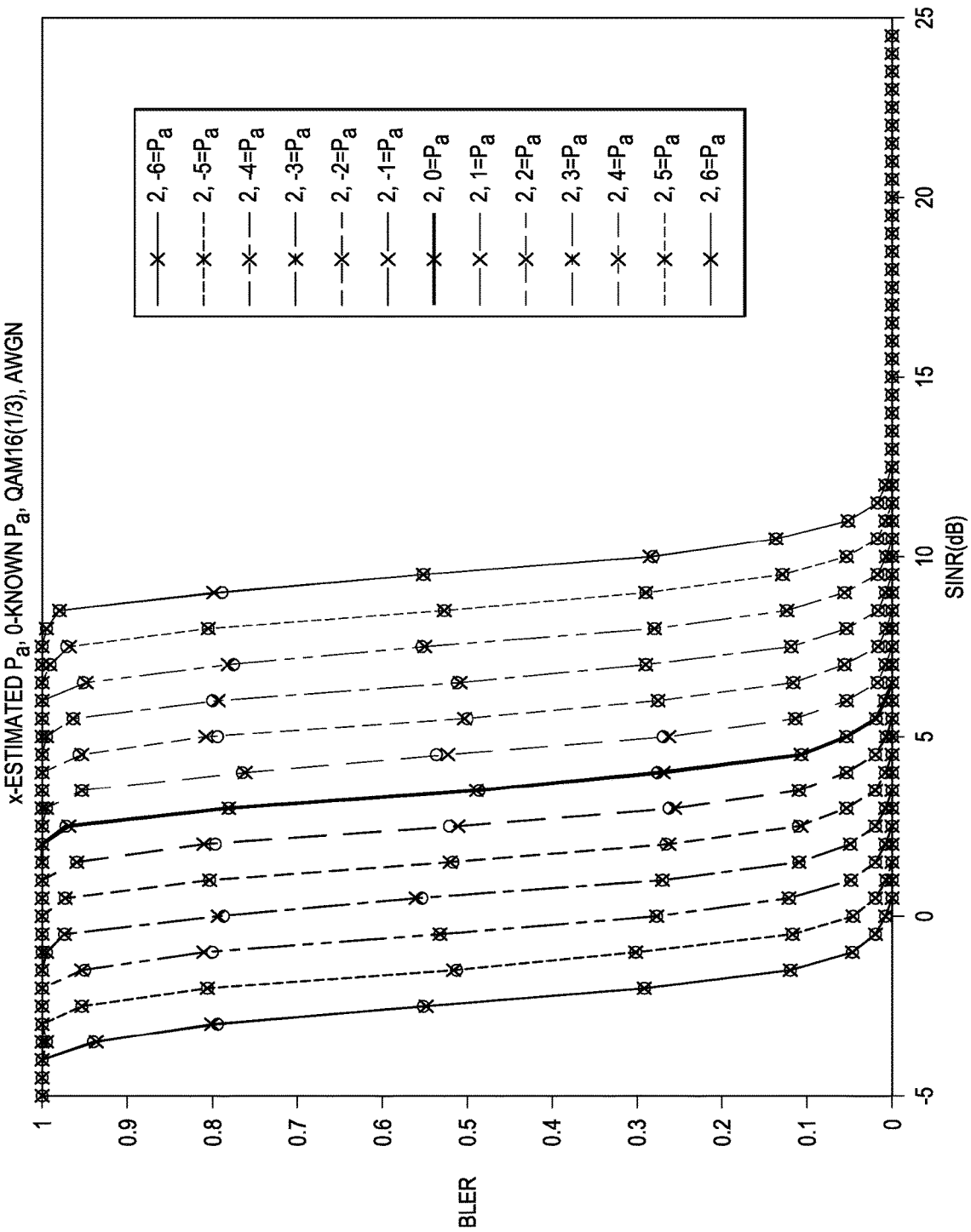
Figure 4J:
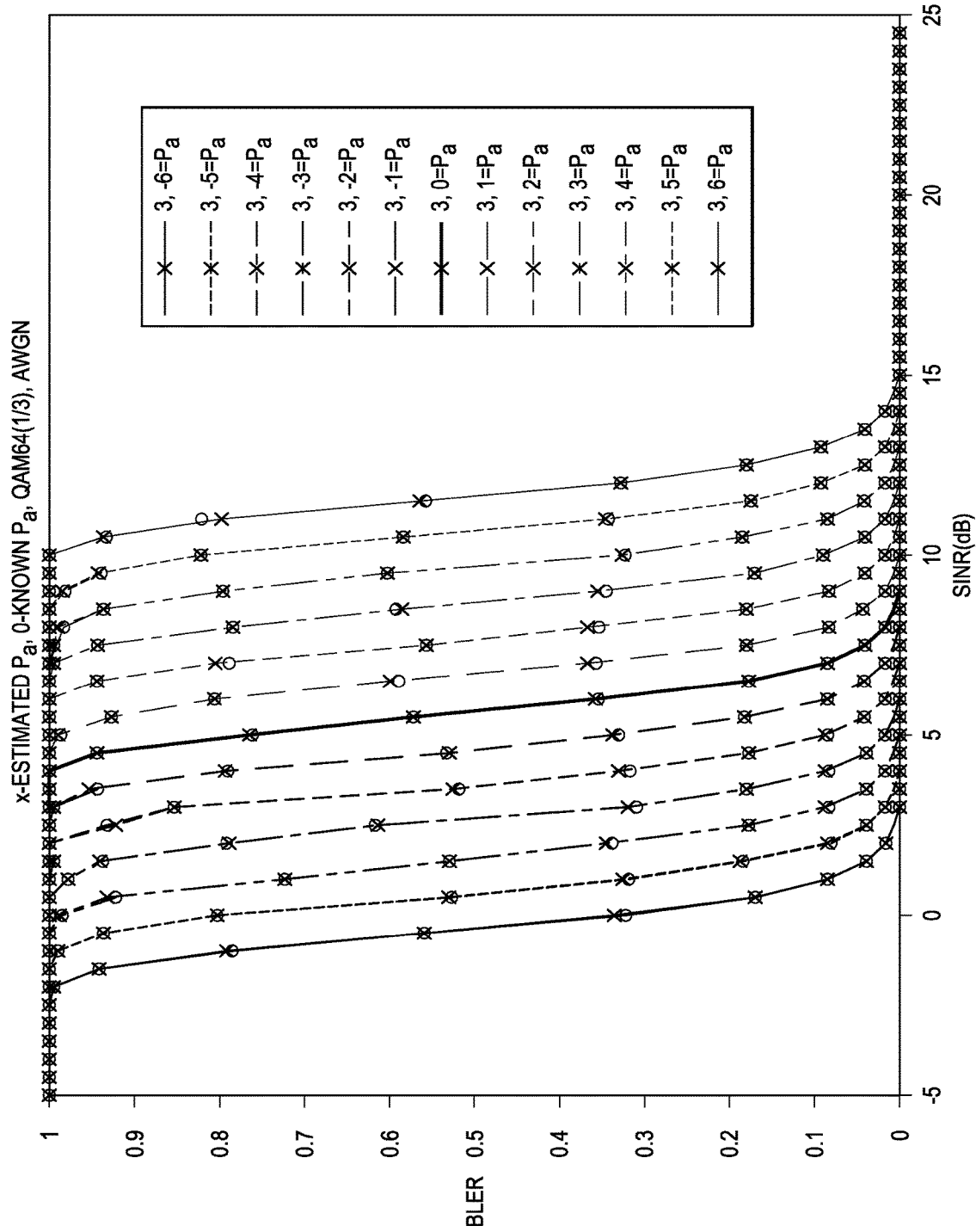

For the AWGN Channel, H is a fixed unit matrix. The BLER curves are shown in FIGS. 4I and 4J. No noticeable degradation is visible. More specifically, FIG. 4I illustrates BLER curves for x-Estimated Pa vs. O-Known Pa for 2×2 MIMO, QAM16 for Convolutional (1/3) and FIG. 4J illustrates BLER Curves for x-Estimated Pa vs. O-Known Pa for 2×2 MIMO, QAM64 for Convolutional (1/3) in AWGN channel model.

Figure 4K:
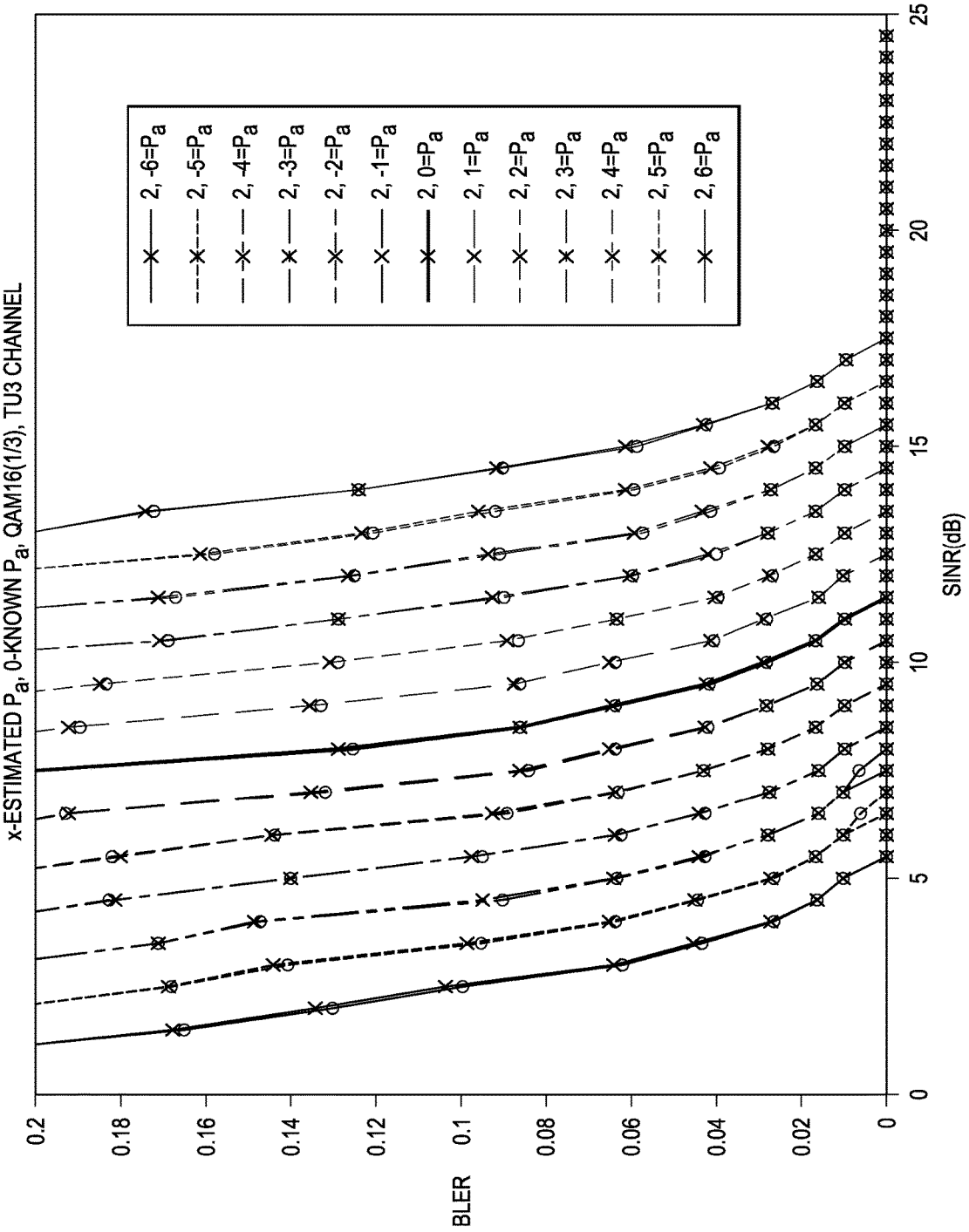
Figure 4L:
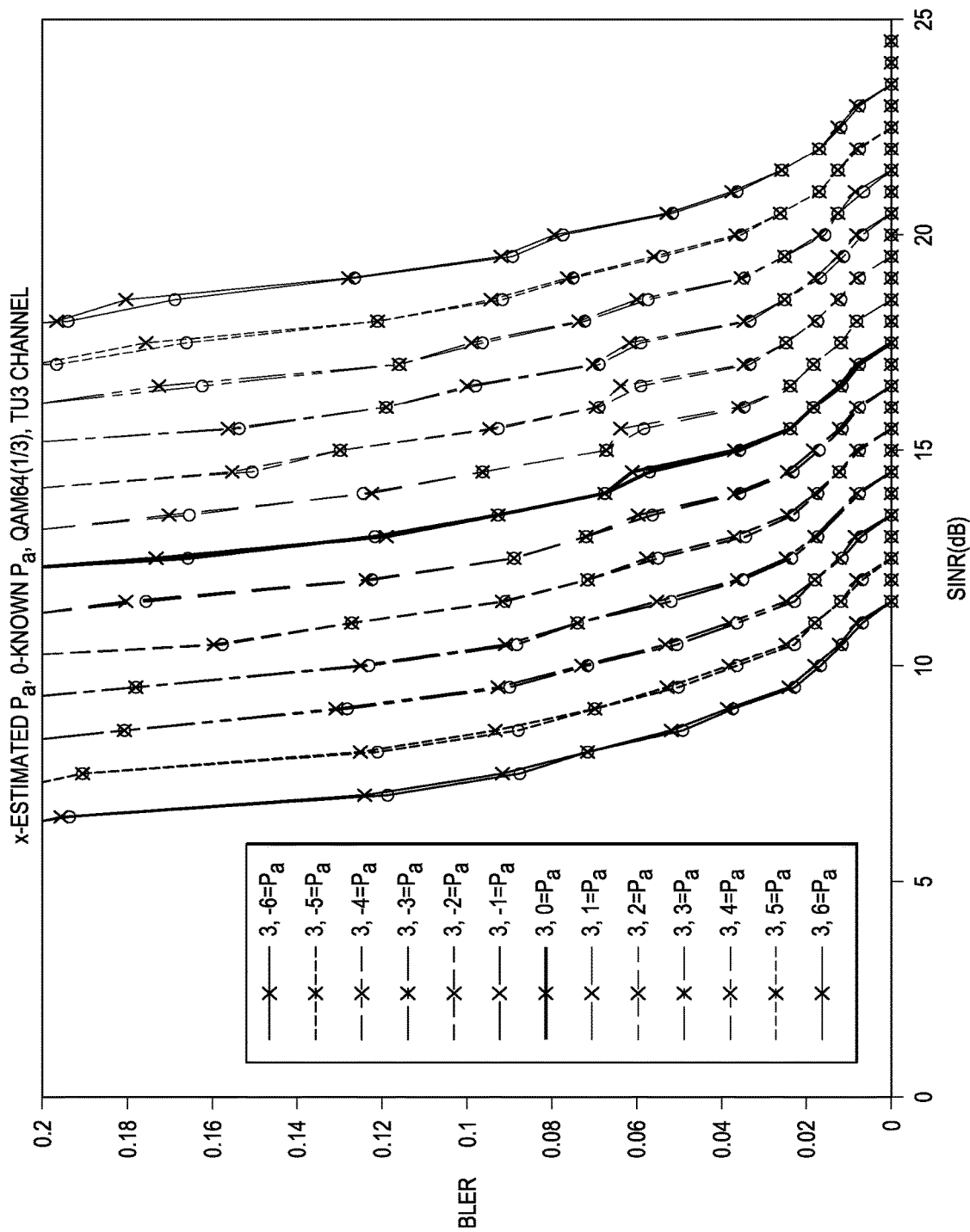

For the TU channel with convolution encoding, H is generated according to a typical urban 3 km/h channel model with 3 RBs per codeblock. The BLER curves are shown in FIGS. 4K and 4L. No noticeable degradation is visible. More specifically, FIG. 4K illustrates BLER Curves for x-Estimated Pa vs. O-Known Pa for 2×2 MIMO for QAM16 and Convolutional (1/3), and FIG. 4L illustrates BLER Curves for x-Estimated Pa vs. O-Known Pa for 2×2 MIMO for QAM64 and Convolutional (1/3) in TU 3 km/h Rayleigh fading channel model.

Figure 4M:
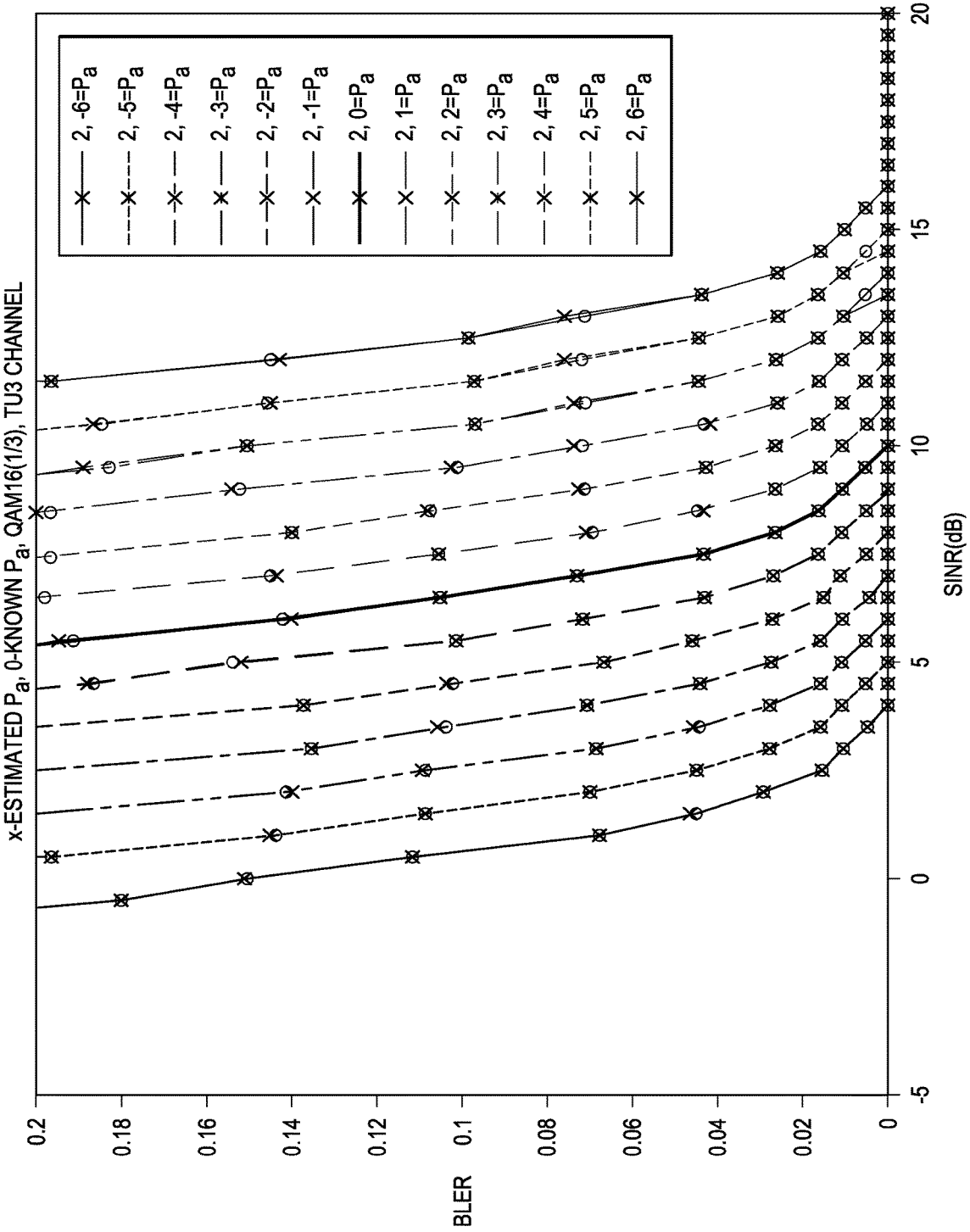
Figure 4N:
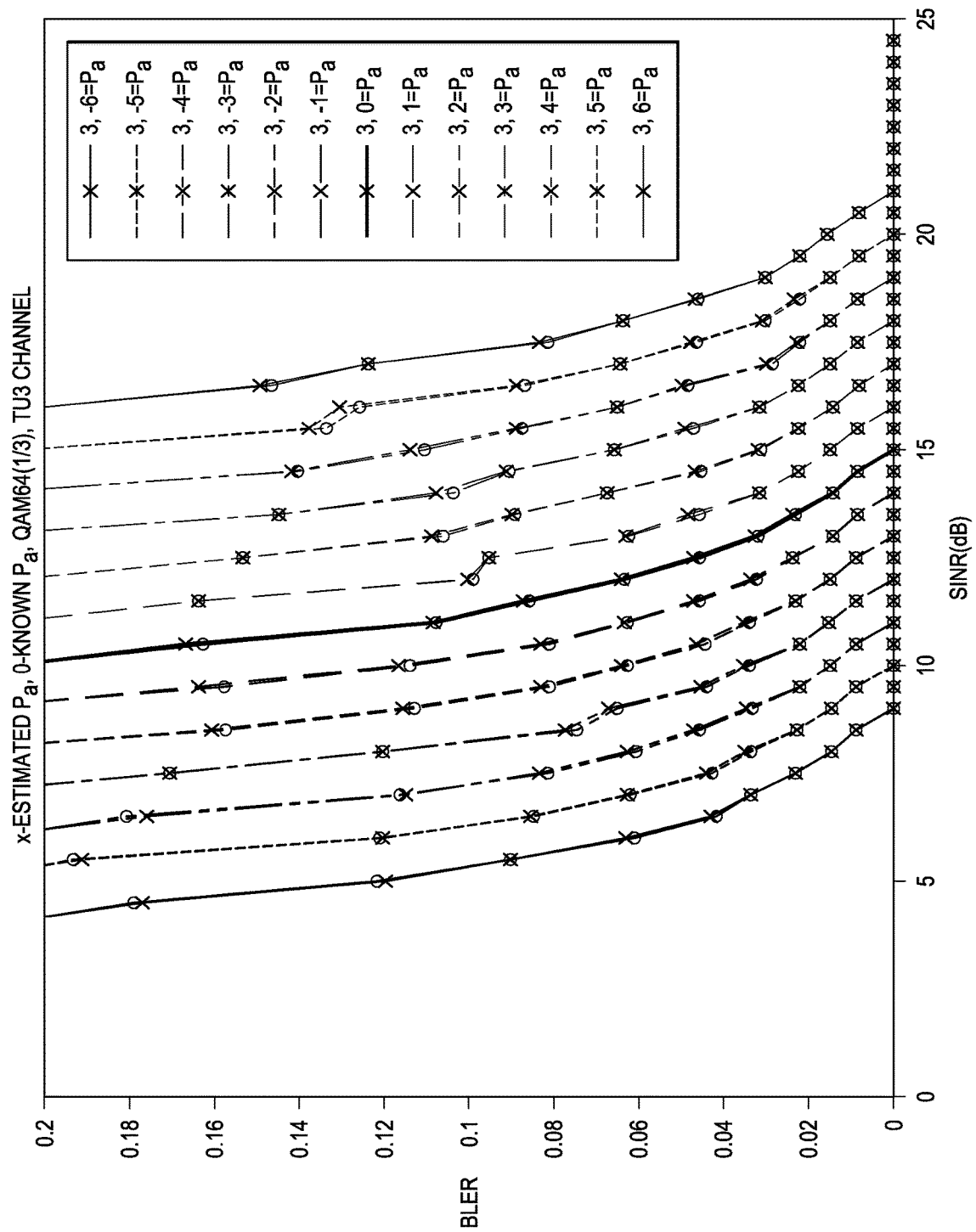

For the TU channel with turbo encoding, H is generated according to a typical urban 3 km/h channel model with 3 RBs per codeblock. The BLER curves are shown in FIGS. 4M and 4N. No noticeable degradation is visible. More specifically, FIG. 4M illustrates BLER Curves for x-Estimated Pa vs. O-Known Pa for 2×2 MIMO for QAM16 and Turbo (1/3), and FIG. 4N illustrates BLER Curves for x-Estimated Pa vs. O-Known Pa for 2×2 MIMO for QAM64 and Turbo (1/3) in TU 3 km/h Rayleigh fading channel model.

The solution described above provides a receiver demodulating a higher order modulation symbol without an explicit magnitude reference received from a base station. It has not been noticed any performance degradation for the cases where the UE has to estimate the arbitrary scaling compared to knowing it.

Another estimator which is not optimal is derived for the MIMO channel as in (4), an estimator for $\alpha^2$ is $$\hat{\alpha}^2 = \frac{1}{N}\sum_{k=1}^{N}\frac{\sum_{i=1}^{n_r}(y_k y_k^H(i,i) - \sigma^2)}{\sum_{i=1}^{n_r} H_k H_k^H(i,i)}. \quad (7)$$

For the scalar signal model, the above estimator reduces to $$\hat{\alpha}^2 = \frac{1}{N} \sum_{k=1}^{N} \frac{y_k y_k^* - \sigma^2}{h_k h_k^*}. \qquad (8)$$

However, this estimator may not always have good performance. For example, as shown in the simulation below, for the typical urban Rayleigh fading channel, performance degrades due to an inaccurate estimation of α.

Embodiment C++ code for the estimator in (8) is provided in Table 3.

TABLE 3

```
cmat Rxx = zeros_c(nRx,nRx);
vec y_var(Nvec);
for (int k = 0; k < Nvec; k++)
{
Rxx = H(k)*H(k).H( );
double H2=0;
for (int j=0;j < nRx;j++)
{ H2=H2+abs(Rxx(j,j));}
y_var(k)=(abs(Y(k)*conj(Y(k)))-nRx*sigma2)/H2;
}
double y_var_est=sum(y_var)/(1.0*Nvec);
double EstBoost=sqrt(y_var_est);
```

For these cases the simulation takes the same parameter as given in Table 2. The channel h is generated according to a typical urban 3 km/h channel model with 3 RBs per codeblock for both convolutional and turbo code with 1/3 rate.

Figure 4O:
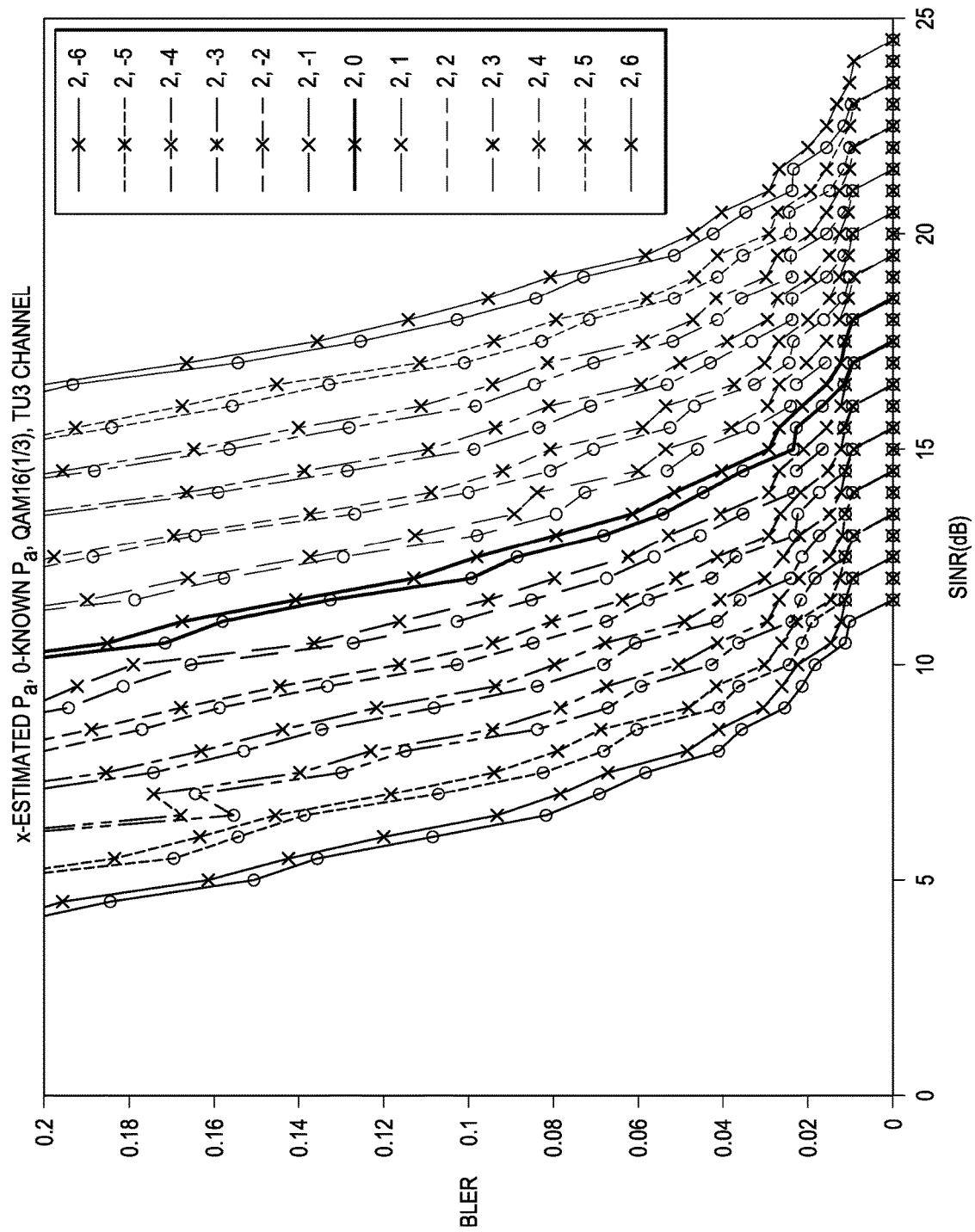
Figure 4P:
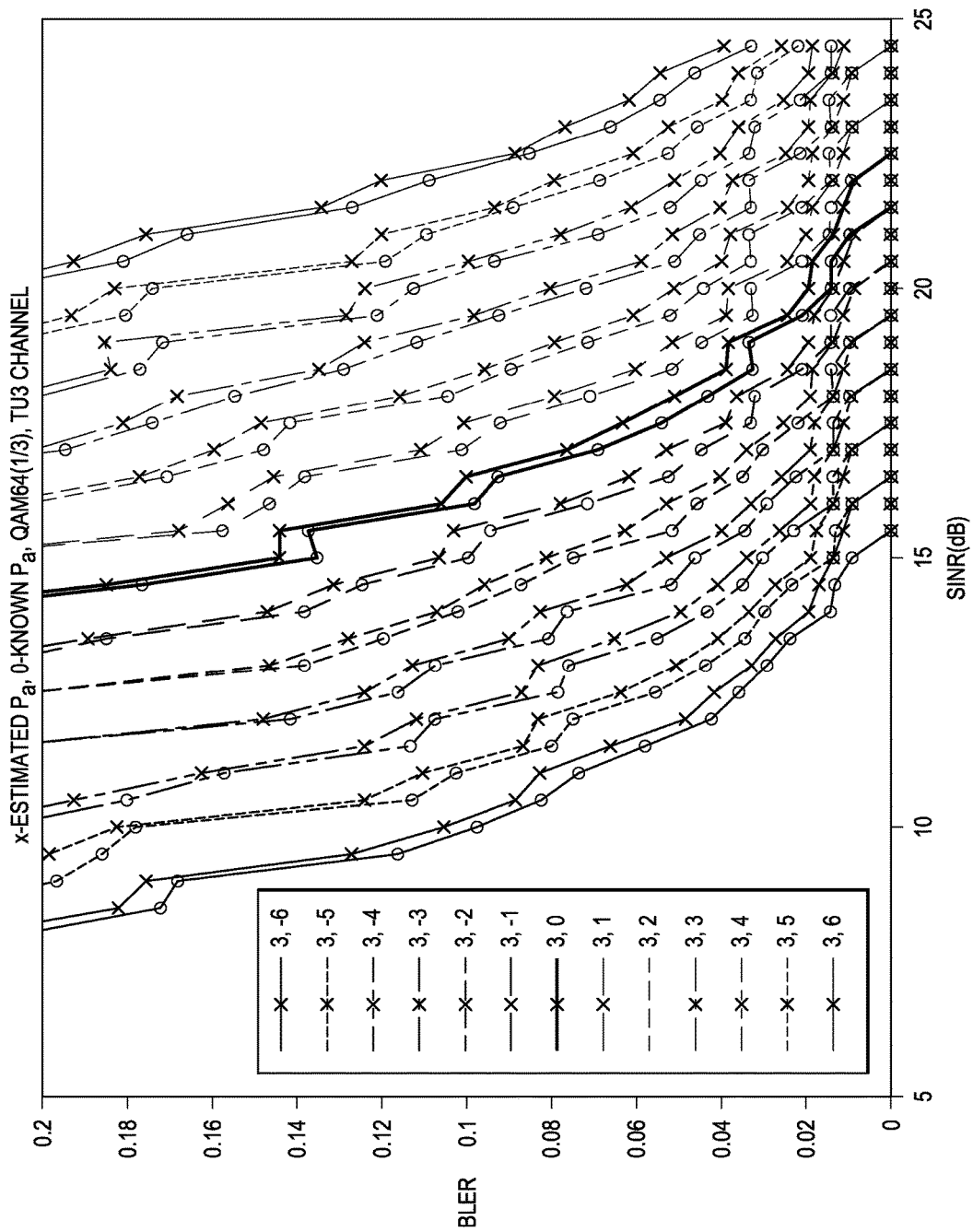

The BLER curves for convolutional code (1/3) are shown in FIGS. 4O and 4P. More specifically, FIG. 4O illustrates BLER Curves for x-Estimated Pa vs. O-Known Pa for QAM16 Convolutional (1/3) and FIG. 4P illustrates BLER Curves for x-Estimated Pa vs. O-Known Pa for QAM64 Convolutional (1/3) in TU 3 km/h Rayleigh fading channel model.

Figure 4Q:
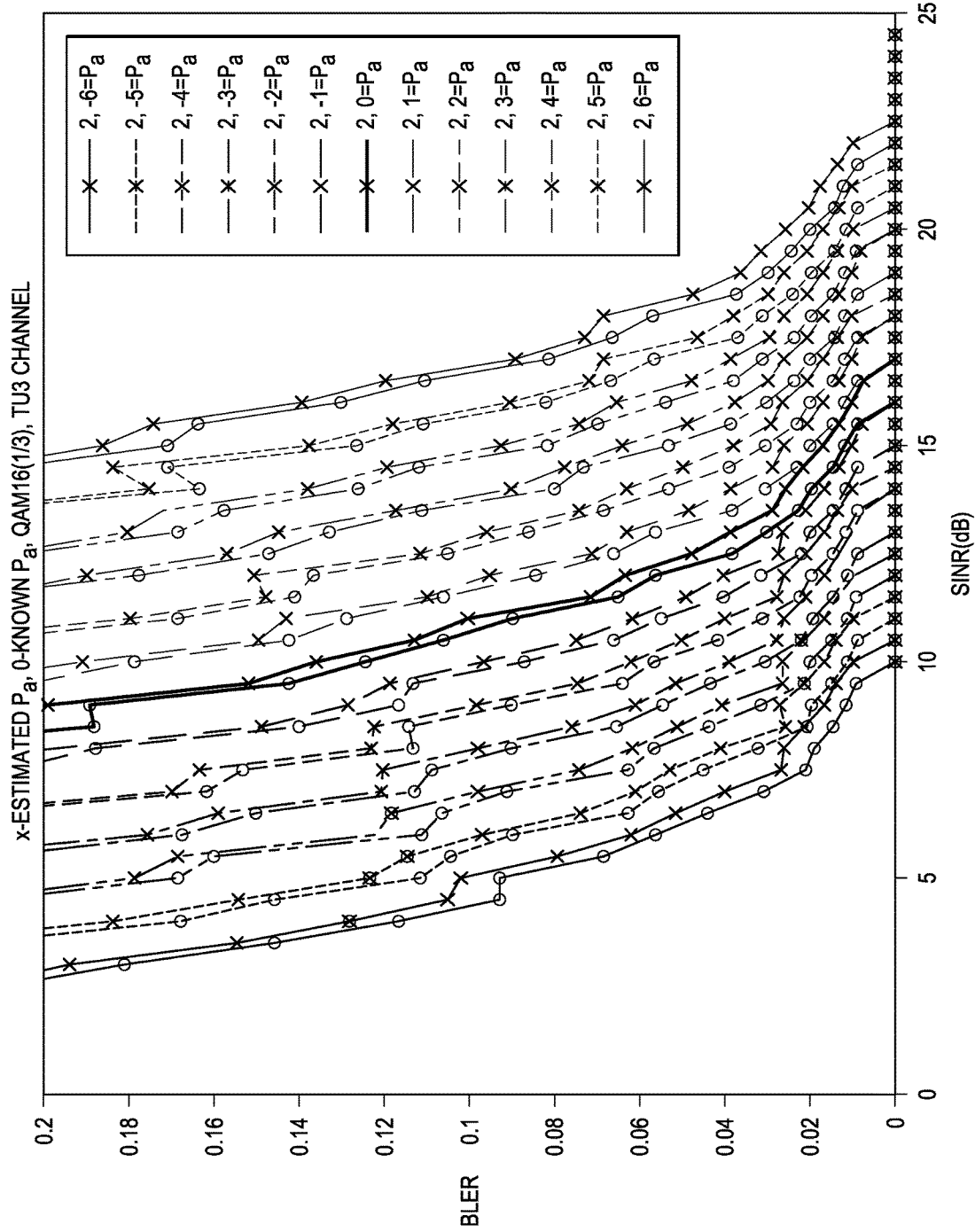
Figure 4R:
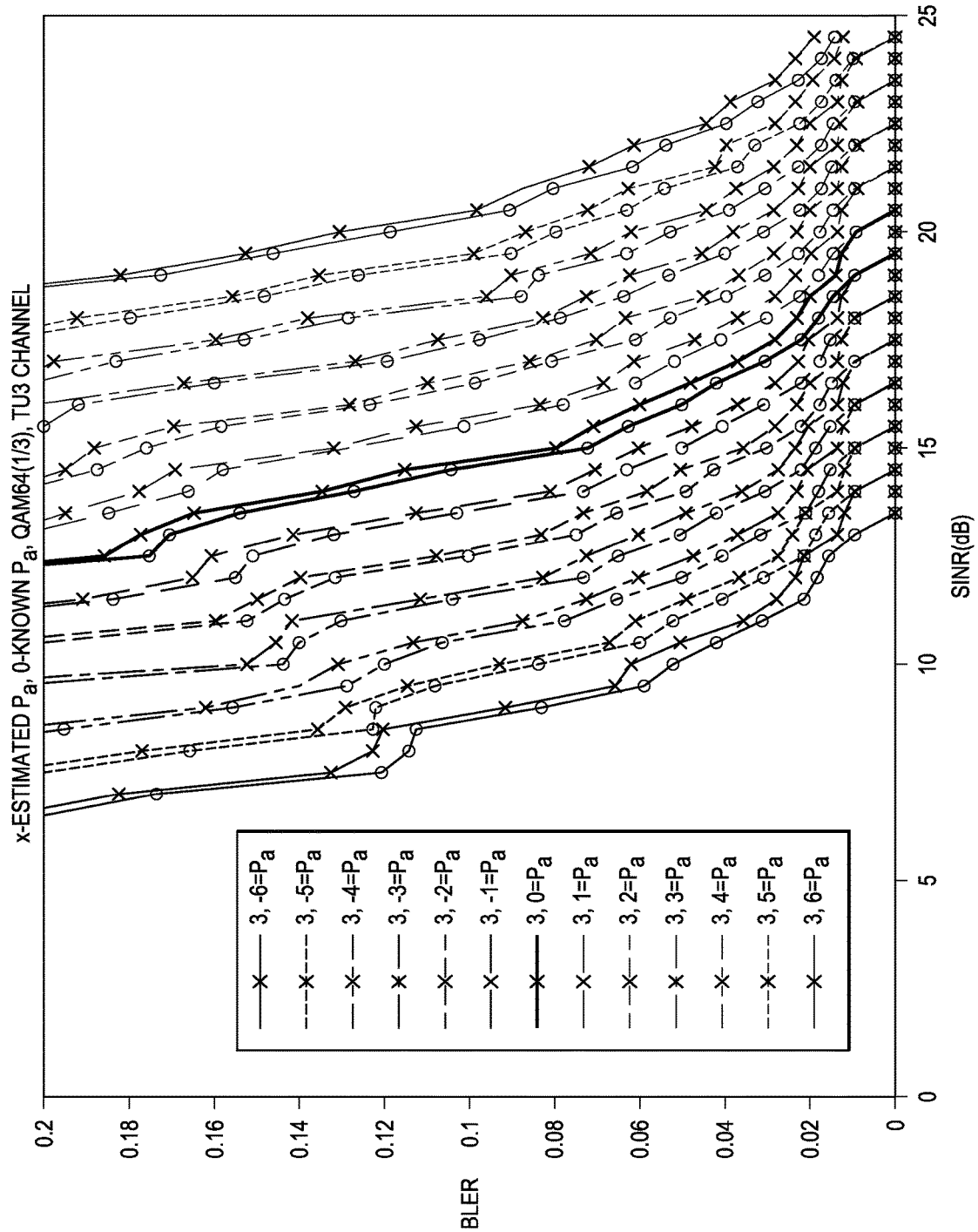

The BLER curves for Turbo code (1/3) are shown in FIGS. 4Q and 4R. More specifically, FIG. 4Q illustrates BLER Curves for x-Estimated Pa vs. O-Known Pa for QAM16 for Turbo (1/3) and FIG. 4R illustrates BLER Curves for x-Estimated Pa vs. O-Known Pa for QAM64, Turbo (1/3), in TU 3 kmph Rayleigh fading channel model.

Figure 5:
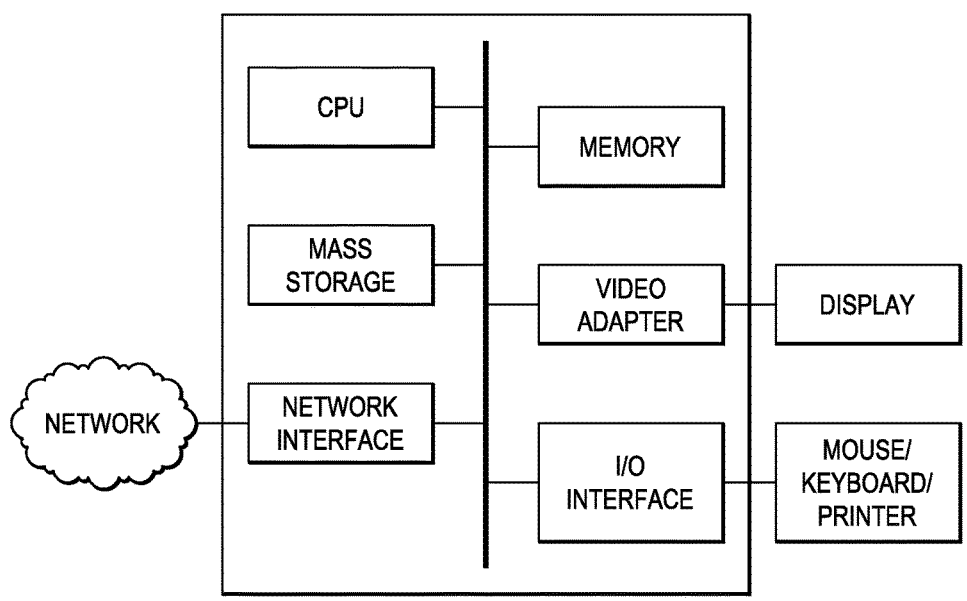
FIG. 5 illustrates a computing platform that may be used for implementing, for example, the devices and methods described herein, in accordance with an embodiment.

FIG. 5 is a block diagram of a processing system that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

An embodiment estimator has been described specifically as an implementation of a UE receiver for receiving downlink transmissions. However, it can equally be implemented in an eNB receiver when it receives uplink transmissions from a UE. Furthermore, embodiments are specifically described for an LTE receiver, but the principles can be applied to any wireless (such as WiFi, etc.) or wire line (such as digital subscriber line (DSL), etc.) receiver employing higher order modulation.

The current embodiment describes only an SU-MIMO scenario. This invention can be equally applied to an MU-MIMO scenario. Reduced signaling overhead since there is no need to signal reference power. It makes dynamic Power control possible. Both lead to higher capacity. Wireless and wireline receiver products (LTE, DSL, WiMaX, WiFi).

The following references are related to subject matter of the present application. Each of these references is incorporated herein by reference in its entirety:

Qualcomm, R1-080654, "On the Signaling of Data/RS Power Ratio for PDSCH with 16QAM (Feb. 11-15, 2008).

Van Rensburg et al., U.S. Patent Application Publication No. 2009/0247175, System and Method for Downlink Control Signal Structure for Multi-User MIMO, published Oct. 1, 2009.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for communicating over a multiple input multiple output (MIMO) channel, the method comprising:

transmitting, by a base station (BS), a downlink MIMO signal to a user equipment (UE), wherein the downlink MIMO signal comprises multiple layers communicated directly to the UE in accordance with a phase parameter and a magnitude parameter; and signaling, by the BS, the phase parameter to the UE without signaling the magnitude parameter to the UE, wherein both the phase parameter and the magnitude parameter are utilized by the UE to demodulate the downlink MIMO signal, the UE being adapted to estimate the magnitude parameter based at least on an additive white Gaussian noise (AWGN) vector associated with the downlink MIMO signal.

2. The method of claim 1, wherein the multiple layers in the downlink MIMO signal are collectively communicated in a unicast transmission.

3. The method of claim 1, wherein the downlink MIMO signal comprises a single user MIMO (SU-MIMO) signal that includes two or more layers communicated directly to the UE.

4. The method of claim 1, wherein the downlink MIMO signal comprises a multi-user MIMO (MU-MIMO) signal that includes two or more layers communicated directly to the UE.

5. The method of claim 1, wherein signaling the phase parameter to the UE without signaling the magnitude parameter to the UE comprises:

transmitting a pilot signal indicating the phase parameter to the UE without signaling a power allocation (Pa) parameter to the UE.

6. The method of claim 1, wherein the downlink MIMO signal further comprises a physical downlink shared channel (PDSCH) and a cell-specific reference signal (C-RS), and wherein signaling the phase parameter to the UE without signaling the magnitude parameter to the UE comprises communicating a pilot signal over the C-RS without communicating a power offset between the pilot signal carried in the C-RS and data carried in the PDSCH to the UE.

7. The method of claim 1, wherein transmitting the downlink MIMO signal to the UE comprises:

modulating an input signal using a quadrature amplitude modulation (QAM) technique in accordance with the magnitude parameter to obtain a modulated signal; and transmitting the modulated signal over the MIMO channel.

8. A base station comprising:

a processor; and a non-transitory computer readable storage medium storing programming for execution by the processor, the programming including instructions to:

transmit a downlink multiple input multiple output (MIMO) signal to a user equipment (UE), wherein the downlink MIMO signal comprises multiple layers communicated directly to the UE in accordance with a phase parameter and a magnitude parameter; and signal the phase parameter to the UE without signaling the magnitude parameter to the UE, wherein both the phase parameter and the magnitude parameter are utilized by the UE to demodulate the downlink MIMO signal, the UE being adapted to estimate the magnitude parameter based at least on an additive white Gaussian noise (AWGN) vector associated with the downlink MIMO signal.

9. A method for communicating over a multiple input multiple output (MIMO) channel, the method comprising:

receiving, by a user equipment (UE), a downlink MIMO signal from a base station (BS), wherein the downlink MIMO signal comprises multiple layers communicated directly to the UE;

receiving, by the UE, a phase parameter associated with the downlink MIMO signal from the BS;

estimating, by the UE, a magnitude parameter associated with the downlink MIMO signal based at least on an additive white Gaussian noise (AWGN) vector associated with the downlink MIMO signal; and demodulating the downlink MIMO signal in accordance with the phase parameter and the magnitude parameter.

10. The method of claim 9, wherein the magnitude parameter is not signaled from the BS.

11. The method of claim 9, wherein the downlink MIMO signal comprises a single user MIMO (SU-MIMO) signal that includes two or more layers communicated directly to the UE.

12. The method of claim 9, wherein the downlink MIMO signal comprises a multi-user MIMO (MU-MIMO) signal that includes two or more layers communicated directly to the UE.

13. The method of claim 9, wherein demodulating the downlink MIMO signal in accordance with the phase parameter and the magnitude parameter comprises:

demodulating the downlink MIMO signal using a quadrature amplitude modulation (QAM) technique in accordance with the phase parameter and the magnitude parameter.

14. The method of claim 9, wherein estimating the magnitude parameter associated with the downlink MIMO signal comprises:

estimating a single scalar variable in accordance with signal characteristics of a physical downlink shared channel (PDSCH) communicated over a resource block group (RBG).

15. The method of claim 14, wherein estimating the single scalar variable in accordance with the signal characteristics of the PDSCH communicated over the RBG comprises:

defining a single unknown scalar variable using received symbols, transmitted symbols, channel information, and AWGN;

extending the single unknown scalar variable to a multivariate signal model using a received symbol vector, a transmitted symbol vector, a channel matrix, and the AWGN vector for multiple channels (N);

converting the multivariate signal model to a MIMO configured signal model using a number of transmit antennas and a number of receive antennas with the received symbol vector, the transmitted symbol vector, the channel matrix, and the AWGN vector;

calculating a least square estimator from the MIMO configured multivariate signal model using the received symbol vector and a channel matrix vector; and obtaining the least square estimator from the MIMO configured multivariate signal model for the multiple channels (N).

16. The method of claim 15, wherein obtaining the least square estimator using the channel matrix vector and the received symbol vector comprises obtaining the least square estimator in accordance with the following equation:

$$\hat{\alpha}^2 = \sum_{k=1}^{N} \frac{\left(\sum_{i=1}^{n_r}(y_k y_k^H(i,i) - \sigma^2)\right)\left(\sum_{i=1}^{n_r} H_k H_k^H(i,i)\right)}{\sum_{j=1}^{N}\left(\sum_{i=1}^{n_r} H_j H_j^H(i,i)\right)^2}$$

where H is a channel matrix vector, and y is a received symbol vector for the multiple channels (N).

17. A user equipment (UE) comprising:
a processor; and
a non-transitory computer readable storage medium storing programming for execution by the processor, the programming including instructions to:
receive a downlink multiple input multiple output (MIMO) signal from a base station (BS), wherein the downlink MIMO signal comprises multiple layers communicated directly to the UE;
receive a phase parameter associated with the downlink MIMO signal from the BS;
estimate a magnitude parameter associated with the downlink MIMO signal based at least on an additive white Gaussian noise (AWGN) vector associated with the downlink MIMO signal; and
demodulate the downlink MIMO signal in accordance with the phase parameter and the magnitude parameter.

18. The UE of claim 17, wherein the magnitude parameter is not signaled from the BS.

* * * * *